United States Patent [19]
Miyagawa

[11] 3,831,183
[45] Aug. 20, 1974

[54] DATA SUPERIMPOSING DEVICE FOR USE WITH CAMERA

[75] Inventor: Fumihiro Miyagawa, Yokohama, Japan

[73] Assignee: Ricoh Co. Ltd., Tokyo, Japan

[22] Filed: Nov. 2, 1973

[21] Appl. No.: 412,096

[30] Foreign Application Priority Data
Dec. 4, 1972 Japan............................ 47-110530
Dec. 4, 1972 Japan............................ 47-110531

[52] U.S. Cl. ............................................. 354/109
[51] Int. Cl. ............................................ G03b 17/24
[58] Field of Search ....................... 95/1.1; 346/107

[56] References Cited
UNITED STATES PATENTS
3,522,611   8/1970   Maronde........................... 346/107

*Primary Examiner*—John M. Horan
*Attorney, Agent, or Firm*—Cooper, Dunham, Clark, Griffin & Moran

[57] ABSTRACT

A data superimposing device is disclosed which permits superimposing upon a film data recorded upon a tape stored in the data capsule which is detachably placed in a camera. The data tape is advanced by the manual operation from the exterior of the camera to be placed upon the writing table which is the exterior part of the data capsule casing. The data to be superimposed are recorded upon the tape through an opening formed in the camera body. The tape is inserted again into the data capsule so that the data upon the tape may be superimposed upon the film through an optical system including a light source.

3 Claims, 9 Drawing Figures

DATA SUPERIMPOSING DEVICE FOR USE WITH CAMERA

BACKGROUND OF THE INVENTION

The present invention relates to a data superimposing device for use with a camera of the type permitting superimposing upon a film manually recorded data such as letters, numbers and pictures.

There has been known in the art a camera of the type in which data such as date, shutter speed, aperture and the like which are prerecorded upon a data indicator which is mounted within or without a camera body may be superimposed upon a film automatically in response to the shutter release operation or manually and independently of the shutter release operation. However the amount of data to be superimposed is very limited. Furthermore in a conventional data recording or superimposing device in which the image of data is focused upon the back surface of the film, the image obtained is not clear. In a conventional data superimposing device of the type in which a data illumination light source is fixed, the data to be superimposed are not uniformly illuminated, so that the image obtained is also not clear. Furthermore in a conventional data superimposing device in which a data bearing member is detachably attached upon a camera body, not only the operation but also the carrying of the detached data bearing member are inconvenient.

SUMMARY OF THE INVENTION

In view of the above, the primary object of the present invention is to provide a novel data superimposing device for use with camera in which a data capsule having a rolled tape housed therein is detachably mounted in a camera body in such a manner that the tape may be advanced from the exterior of the camera body to permit the recording of data to be superimposed upon the tape at the exterior of the data capsule. The tape is further advanced to place the recorded data in an exposure aperture or window of the data capsule, through which the data are superimposed upon a film through an optical system including a light source. The optical system is mounted upon a member which is slidable in the longitudinal direction of the exposure aperture or window.

The present invention will become more apparent from the following description of one preferred embodiment thereof taken in conjunction with the accompanying drawings.

DESCRIPTION OF THE PREFERRED EMBODIMENT

Figure 1:
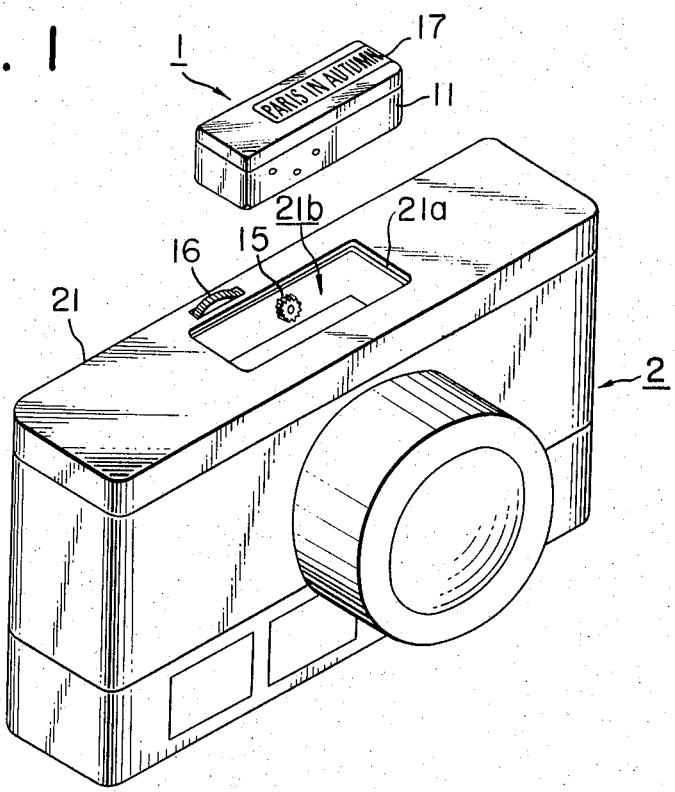
FIG. 1 is a perspective view of a camera incorporating a data superimposing device with a data capsule in accordance with the present invention.
Figure 2:
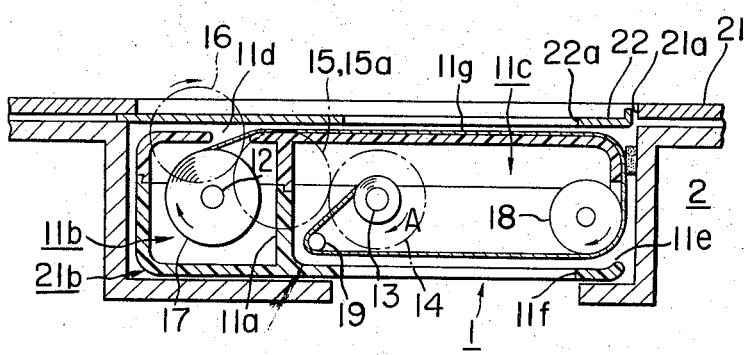
FIG. 2 is a sectional view illustrating the interior of the data capsule placed in a camera body.

FIG. 1 is a perspective view of a camera incorporating a data superimposing device in accord with the present invention and a data capsule 1 thereof which is to be placed in a chamber 21b formed within a camera body 2 through an opening 21a formed in a bottom plate 21 as shown in FIG. 2. After the capsule 1 is placed in position a sliding cover 22 closes the opening 21a. A casing 11 of the data capsule 1, which comprises an upper section and a lower section, is divided by a partition wall 11a into a supply reel chamber 11b and a takeup reel chamber 11c in which are disposed a supply spindle 12 and a takeup spindle 13, respectively. The takeup spindle 13 has a gear 14 formed integral therewith and in mesh with a gear 15 disposed within the storage chamber 21b. The gear 15 is in mesh with a pinion 15a disposed within the camera body 2 and in mesh with a gear 16 a part of which is extended beyond the bottom plate 21. Thus when the gear 16 is rotated, the takeup spindle 13 is rotated in the direction indicated by the arrow A.

Figure 3:
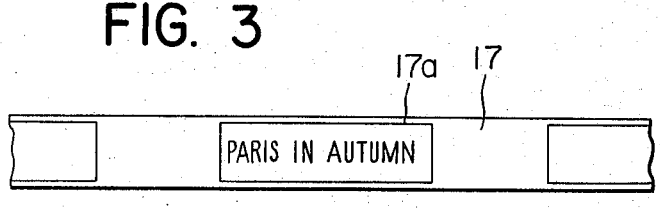
FIG. 3 is a fragmentary view of a tape housed within the data capsule.

A rolled tape 17 made of paper, plastic film or the like is mounted on the supply spindle, extended through a slit 11d formed in the casing 11 of the data capsule 1 over a writing table 11g, inserted again into the casing 11 through a slit 11e, wrapped around guide rollers 18 and 19 and wound around the takeup spindle 13. As best shown in FIG. 3, a plurality of frames 17a provided on the data tape 17 are spaced apart from each other by a predetermined distance and have a size substantially equal to that of an opening 22a of the sliding cover 22. Furthermore the position of the frames 17a is determined in such a manner that when one frame 17a is positioned within the opening 22a of the sliding cover 22, the preceding frame 17a is placed in an exposure aperture or window 11f.

Figure 4:
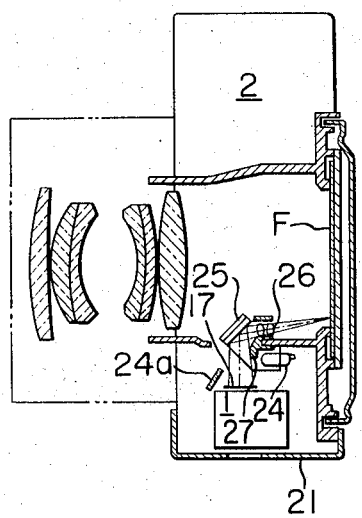
FIG. 4 is a sectional view of the camera shown in FIG. 1.
Figure 5:
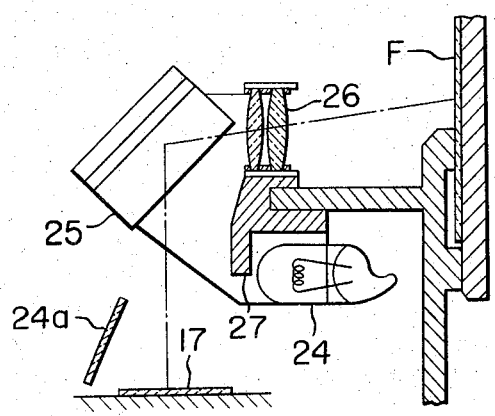
FIG. 5 is a view on enlarged scale illustrating an optical superimposition system thereof.
Figure 6:
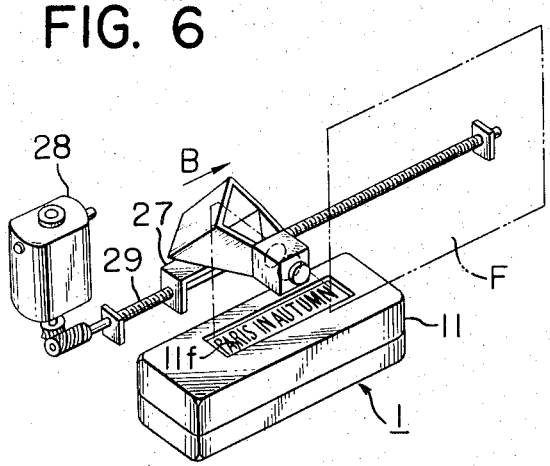
FIG. 6 is a perspective view of a scanning mechanism of the optical superimposition system.

FIGS. 4 and 5 show the optical system of the data superimposing device of the present invention. The frame 17a placed in the exposure aperture or window 11f is illuminated by light directly from a light source 24 and by light reflected by a reflecting mirror 24a. In order to change the direction of the optical path, a roof type reflecting mirror 25 shown in greater detail in FIG. 5 or a roof prism 25a shown in FIG. 7 is disposed in opposed relation with a projection lens 26. The light source 24, the roof type reflecting mirror assembly 25 and the projection lens 26 are mounted on a sliding mount 27 carried by a screw rod 29 which is rotated by a micro motor 28 mounted within the camera body 2 as shown in FIG. 6, so that the mount 27 may be slidable over the exposure aperture or window 11f and hence the frame 17a of the tape 17 in the longitudinal direction thereof. The micro-motor 28 is started in response to the shutter release operation or independently thereof from the exterior of the camera body 2, to move thereby the sliding mount 27 in the direction indicated by the arrow B so that the data in the frame 17a may be scanned and superimposed upon a part of a film F. The micro-motor 28 may be reversed in response to the operation of advancing the film F or independently thereof to return the mount 27 to its initial position. Alternatively the mount 27 may be reversed to the initial position in response to the next shutter release operation to scan and superimpose the data in the frame 17a upon the film F.

Figure 7B:
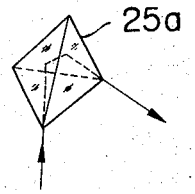
FIG. 7B is a perspective view of a roof prism thereof.
Figure 7A:
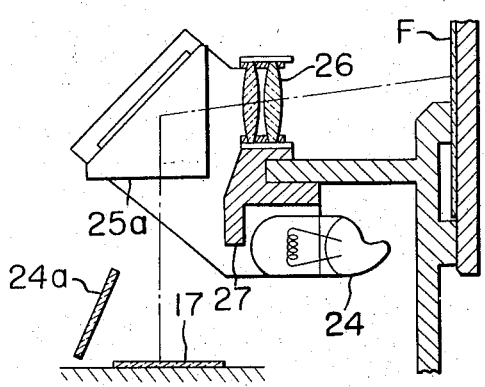
FIG. 7A is a view similar to FIG. 5 illustrating a variation of an optical superimposition system.

Instead of the roof type reflecting mirror assembly 25, the roof prism 25a shown in FIGS. 7A and 7B may be used.

Figure 8:
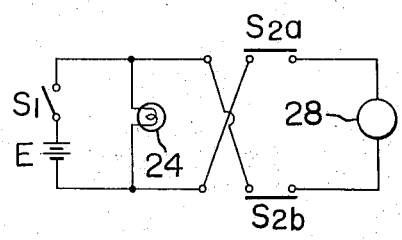
FIG. 8 is a circuit diagram of the data superimposing device of the present invention.

FIG. 8 is a circuit diagram of the data superimposing device in accordance with the present invention. E denotes a power source; $S_1$, a main switch actuable in response to the shutter release operation to energize the light source 24 and the micro-motor 28; and a selection switch $S_{2a}$ and $S_{2b}$ reverses the rotation of the micro-motor 28.

In order to mount the rolled tape 17, the casing 11 of the data capsule 1 is disassembled into the upper and lower sections, and the rolled data tape 17 is mounted on the supply spindle 12. Thereafter the upper and lower sections are assembled. The free end of the rolled tape 17 is pulled out of the casing 11 through the slit 11d, extended over the writing table 11g, inserted into the slit 11e, wrapped around the guide rollers 18 and 19, and wound around the takeup spindle 13. The data capsule 1 is placed into the chamber 21b in the camera body 2, and the sliding cover 22 is pulled over the data capsule 1, thereby holding it securely in position.

The operator now writes the desired data such as a date, a place where a picture is taken and such on the frame 17a exposed through the opening 22a of the sliding cover 22. Thereafter he rotates the gear 16 by a finger to advance the frame 17a into the exposure aperture or window 11f so that when he depresses a shutter button, the data in the frame 17a may be superimposed upon the film F in the manner described hereinbefore. That is, when the shutter release button is returned to its initial position after the exposure of a subject, the micro-motor 28 and the light source 24 are energized so that the data in the frame 17a in the exposure aperture or window 11f are illuminated and scanned by the optical system consisting of the roof type reflecting mirror assembly 25 or roof prism 25a and the projection lens 26. Thus the data are superimposed upon a part of the film F. When it is desired to superimpose the data independently of the shutter release operation, the main switch $S_1$ is manually closed.

The writing table 11g completely covers the opening 22a of the sliding cover 24 to shield the light rays from the exterior so that no exterior light reaches the frame 17a in the exposure aperture or window 11f. In the instant embodiment, the takeup spindle 13 is rotated by the rotation of the gear 16, but it is to be understood that a knob may be disposed on the data capsule 1 so as to directly or indirectly rotate the takeup spindle 13.

According to the present invention, the data capsule is placed in a space available at the bottom of the camera body so that it is not required to increase the dimensions of a camera body. Furthermore since a rolled tape is used, a large amount of data may be recorded in a limited space so that various data may be superimposed. Since the light source, and the optical system are mounted on the same slidable mount so as to scan the data in the frame in the exposure aperture or window, the data may be clearly superimposed over a relatively wide portion of the film F without any distortion. Furthermore the part, which serves as the writing table, of the casing completely shields the exterior light rays so that no extra shielding member may be required. Therefore the data superimposing device in accordance with the present invention is very simple in construction.

What is claimed is:

1. A data superimposing device for use with a camera comprising
   a. a data capsule in which is stored a rolled tape upon which are recorded data to be superimposed,
   b. a chamber formed in a camera body for removably receiving said data capsule therein,
   c. an opening formed through said camera body so that desired data may be recorded through said opening upon said rolled tape in said data capsule,
   d. a lens for focusing the data upon a film,
   e. a reflecting mirror for redirecting light from said data to be superimposed to said lens,
   f. a light source for illuminating the data to be superimposed,
   g. a member upon which are mounted said lens, said reflecting mirror and said light source and which is adapted to move in the longitudinal direction of the data to be superimposed, and
   h. means for driving said mounting member.

2. A data superimposing device for a camera as defined in claim 1 wherein said data capsule comprises a casing consisting of detachable sections; said casing including:
   a. a supply reel chamber having a supply reel of an exchangeable rolled tape and a slit through which the tape is pulled out of said supply reel chamber to the exterior of said casing,
   b. a takeup reel chamber having a takeup reel for taking up the tape supplied from said supply reel,
   c. a writing table upon which is placed the tape pulled out of said supply reel chamber so that data to be superimposed may be recorded upon said tape,
   d. a slit for inserting the tape upon which are recorded the data to be superimposed into said takeup reel chamber,
   e. an exposure aperture or window through which the data to be superimposed are exposed, and wherein
   the rolled tape in said supply reel chamber is extended through said first mentioned slit over said writing table, inserted again into said casing through said second mentioned slit, passed through said exposure aperture or window and received in said takeup reel chamber.

3. A data superimposing device for a camera as defined in claim 2 wherein
   the size and spacing of the frames on said tape upon which the data to be superimposed upon said film are recorded are so determined that when one frame is placed in said opening through which the data to be superimposed are recorded upon said one frame, the proceding frame is correctly placed in said exposure window.

* * * * *